United States Patent [19]

Hickman

[11] Patent Number: 5,349,520
[45] Date of Patent: Sep. 20, 1994

[54] APPARATUS FOR SURVEYING AND MARKING HIGHWAYS

[76] Inventor: Bruce F. Hickman, 971 Ohio Ave., Elmore, Ohio 43416

[21] Appl. No.: 756,907

[22] Filed: Sep. 9, 1991

Related U.S. Application Data

[63] Continuation-in-part of Ser. No. 443,594, Nov. 29, 1989, abandoned.

[51] Int. Cl.$^5$ ............................................. G06F 15/50
[52] U.S. Cl. ............................ 364/424.01; 364/461; 342/118; 342/463; 377/24.1
[58] Field of Search ................. 364/424.01, 424.02, 364/424.03, 461; 73/146, 902; 340/903, 905; 342/47, 118; 324/171; 377/24.1

[56] References Cited

U.S. PATENT DOCUMENTS

| | | | |
|---|---|---|---|
| 3,796,864 | 3/1974 | Sampey | 340/33 |
| 4,586,138 | 4/1986 | Mullenhoff et al. | 364/424 |
| 4,653,316 | 3/1987 | Fukuhara | 73/146 |
| 4,674,327 | 6/1987 | Swindall et al. | 73/146 |
| 4,741,207 | 5/1988 | Spangler | 73/146 |

Primary Examiner—Thomas G. Black
Assistant Examiner—Tan Q. Nguyen
Attorney, Agent, or Firm—Howard & Howard

[57] ABSTRACT

An apparatus for collecting, processing and storing data related to the physical features of a highway is carried in one or two vehicles traveling over the highway to be surveyed. A computer in a vehicle receives a signal indicating the distance traveled and various inputs from the vehicle driver, an operator/passenger in the vehicle and/or one or more detectors. The computer can be connected to a display in the vehicle for visually displaying new data as it is collected and previously stored data for comparison purposes. In some instances, the data being collected requires a second vehicle and the computer is connected to the second vehicle via customized radio telemetry equipment which allows for sending signals to and receiving signals from a portion of the system located in the following vehicle.

12 Claims, 5 Drawing Sheets

APPARATUS FOR SURVEYING AND MARKING HIGHWAYS

This application is a continuation-in-part of U.S. patent application Ser. No. 07/443,594, filed Nov. 29, 1989, now abandoned.

BACKGROUND OF THE INVENTION

The present invention relates generally to an apparatus for surveying physical features of highways and, in particular, to an apparatus for generating a data base of information for use in traffic engineering matters.

An accurate inventory of the location and condition of various physical features of highways is essential to the efficient maintenance of our state and federal highway systems. U.S. Pat. No. 3,796,864 discloses a vehicle separation measuring system in which distance pulses generated in a lead vehicle are transmitted by radio to a tracking vehicle and are compared with distance pulses generated by the tracking vehicle to generate an audio output corresponding to a comparison of the actual distance between the vehicles with a desired distance between vehicles. U.S. Pat. No. 3,809,864 discloses a paint sprayer marking system and an associated distance measuring instrument is described in U.S. Pat. No. 3,865,305.

The following U.S. patents show systems for displaying the position of the vehicle relative to mile marker posts: U.S. Pat. Nos. 4,068,307; 4,103,332; 4,145,605; and 4,229,724. The following U.S. patents show electronic circuits which are utilized as vehicle trip odometers: U.S. Pat. No. 4,263,657; 4,382,178 and 4,665,497. U.S. Pat. No. 4,470,149 discloses a circuit for measuring the length and counting road marking line segments as they are painted.

SUMMARY OF THE INVENTION

The present invention concerns an apparatus for collecting, processing and storing data related to the physical features of a highway in a data base for use by traffic engineers. The data is collected by vehicles traveling over the highway to be surveyed. A vehicle carries a computer which receives a signal indicating the distance traveled and various inputs from the vehicle driver and an operator/passenger in the vehicle. The computer can be connected to a display in the vehicle for visually displaying new data as it is collected and previously stored data for comparison purposes. The computer can also be connected to a printer, for creating a more permanent visual record of the data, and to the data base through a storage device or a communication device for entering the newly collected data into the data base.

In some instances, the data being collected requires a second vehicle and the computer is connected to the second vehicle via customized radio telemetry equipment which allows for sending signals to and receiving signals from a portion of the system located in the following vehicle. An odometer transducer in the second vehicle generates pulses that are in direct relation to distance traveled. The low frequency pulses are encoded and transmitted to the computer in the first vehicle. The first vehicle then sends a separation distance signal back to the second vehicle which signal is converted to a display for the driver for maintaining a predetermined separation distance.

The driver and the operator/passenger of the first vehicle input data with respect to various physical features such as no passing zones, intersections, railroad crossings, bridges and the like. A pair of level detectors also generate signals to the computer indicating the orientation of the longitudinal axis and the transverse axis of the vehicle with respect to a horizontal plane thereby indicating the contour of the roadway. A pair of motion detectors generate signals which permit a speed zone survey. The operator/passenger in the first vehicle and the driver of the second vehicle are also provided with input devices which enable a center line survey to be conducted using the sight light method.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
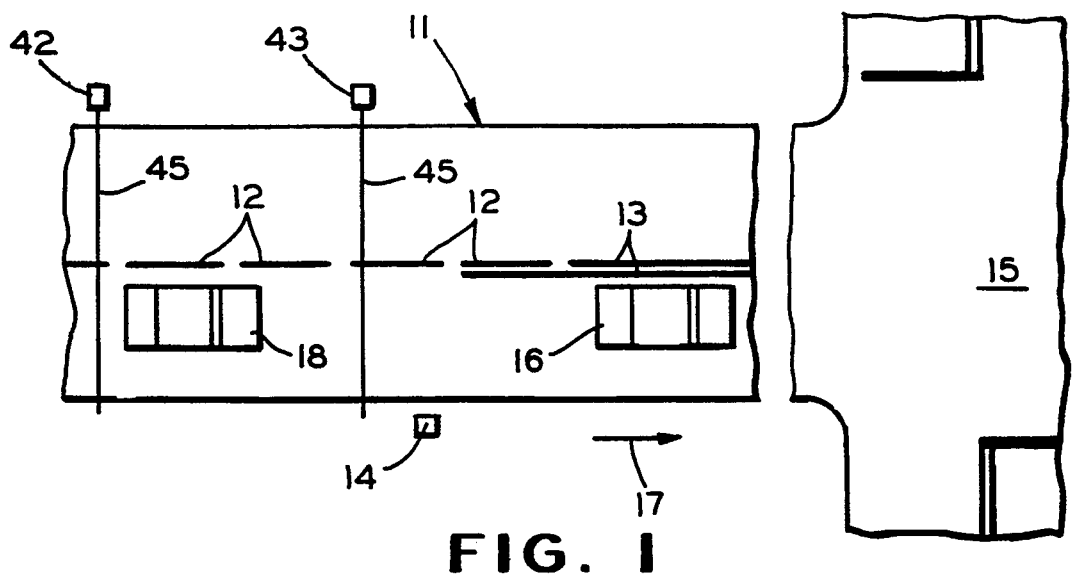
FIG. 1 is a schematic diagram of two vehicles travelling on a highway utilizing a survey apparatus in accordance with the present invention.

A portion of a two lane highway 11 is shown schematically in FIG. 1. Typically, the center line of the highway is marked by a series of painted stripes 12. A "no passing" zone may be indicated by a solid center line 13 and a suitable traffic sign 14 located adjacent the side of the highway 11. Typically, the highway 11 also includes various other physical features such as an intersection 15 and (not shown) railroad crossings, bridges and the like. The identification and location of the physical features of the highway are important information utilized by traffic engineers in determining speed limits, the placement of various traffic signs and the maintenance of highway markings and signs.

Figure 2:
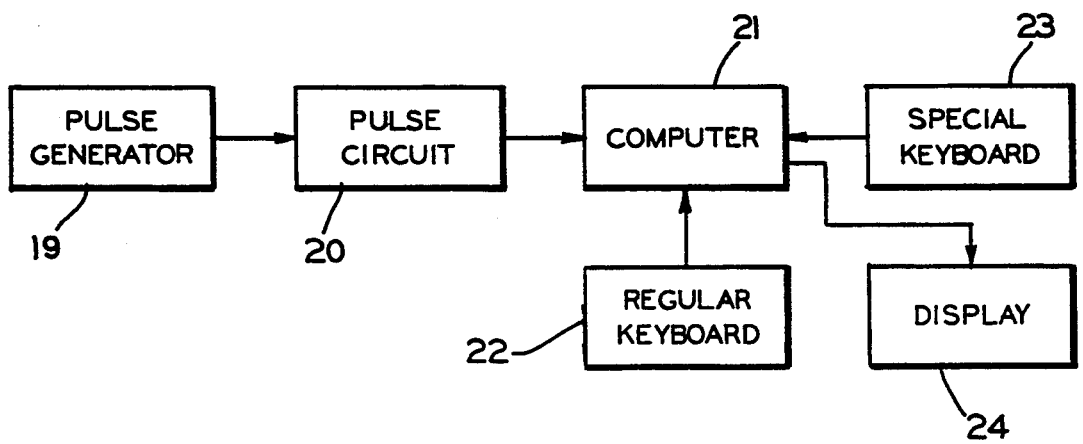
FIG. 2 is block diagram of a basic highway survey apparatus utilized with the lead vehicle shown in FIG. 1.

The present invention concerns a highway survey and engineering apparatus which gathers data during movement along the highway and organizes such data into a data base for later use in various highway traffic engineering procedures. There is shown in FIG. 2, a block diagram of a basic highway survey apparatus, in accordance with the present invention, which requires only the utilization of a lead vehicle 16 as shown in FIG. 1. A pulse generator 19 generates a relatively low frequency series of pulses representing increments of distance traveled by the vehicle 16. The pulse generator can be any conventional transducer which senses the movement of a portion of the vehicle which is representative of the distance traveled. For example, the pulse generator 19 could be a Model AA-1414 Hall Effect Transducer manufactured by the Arthur Allen Mfg. Corp. Such a transducer would be mounted to sense the rotation of the vehicle odometer cable which rotation is proportional to the distance traveled by the vehicle.

The output signal from the pulse generator 19 is a series of pulses which are connected to an input of a pulse circuit 20. The pulse circuit 20 can be a counter time card Model CTM-05 manufactured by Metra Byte Corp. The pulse circuit 20 is responsive to the pulse train signal generated by the pulse generator 19 to generate a signal to an input of a computer 21. Although the computer 21 could be any suitable microcomputer, several portable computers are manufactured which are especially adapted for use in vehicles. For example, Advance Electronic Diagnostics Inc. manufactures a Model VMS-1000 computer in a portable configuration (similar to an IBM PC/XT) for in-vehicle use. Included with the computer 21 from the manufacturer are a standard or regular keyboard 22 and a special keyboard 23 positioned adjacent a display 24. In this configuration, the basic system performs standard distance measuring functions such as calibrate, preload, zero, count up and count down.

Figure 3:
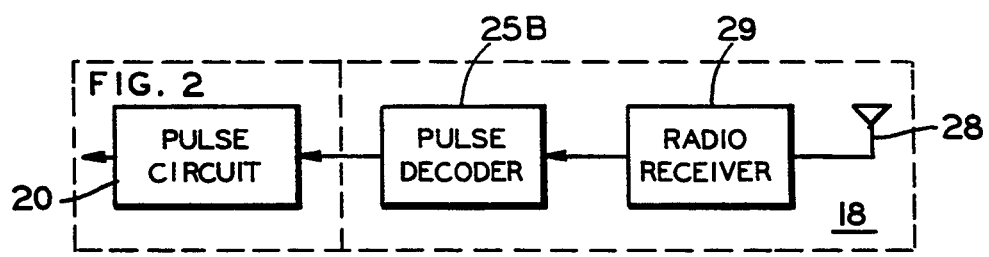
FIG. 3 is a block diagram of an alternate embodiment of the highway survey apparatus utilized for single direction communication between the vehicles shown in FIG. 1 and having expanded survey features.
Figure 3:
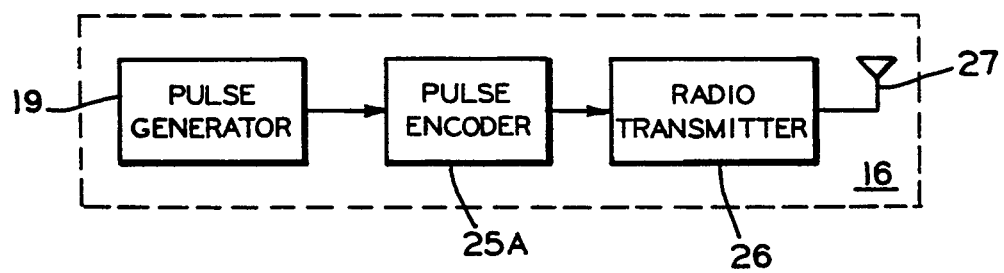

Various components can be added to the basic system shown in FIG. 2 to enable the apparatus to perform expanded survey functions. In FIG. 3, the lead vehicle 16 is provided with the pulse generator 19 and the pulse circuit 20 is replaced with a pulse encoder circuit 25A having an output connected to an input of a radio transmitter 26 having an output connected to an antenna 27. The encoder 25A converts the relatively low frequency distance pulses to a signal which can be transmitted by radio. Thus, the lead car 16 generates a radio signal representing the increments of distance being traveled. This radio signal is received by an antenna 28 mounted on a trailing vehicle 18 shown in FIG. 1. The antenna 28 is connected to an input of a radio receiver 29 which generates the received signal to a pulse decoder circuit 25B. The decoder circuit 25B converts the radio signal back into a relatively low frequency series of pulses representing increments of travel which pulses are inputted to the computer 21 via the pulse circuit 20.

Figure 4:
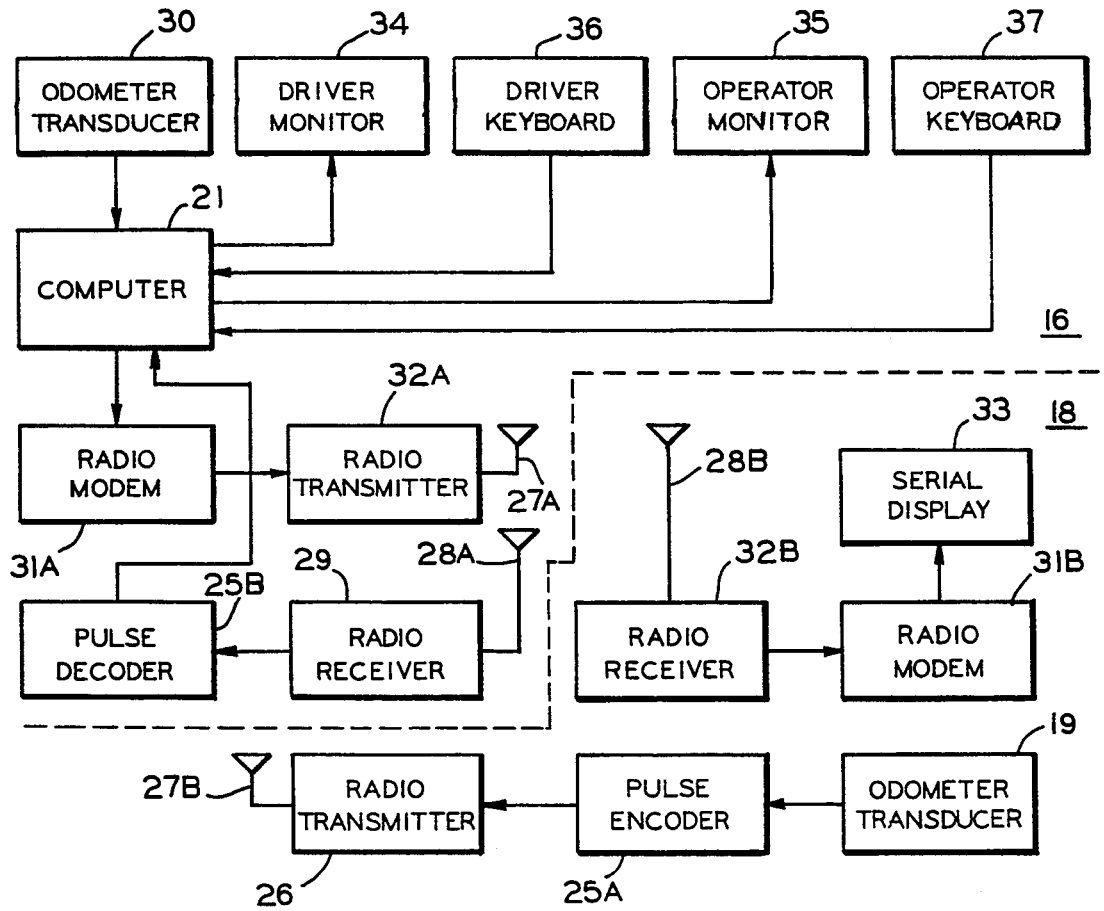
FIG. 4 is a block diagram of a second alternate embodiment of the highway survey apparatus utilized for dual direction communication between the vehicles shown in FIG. 1 and having expanded survey features.

The apparatus shown in FIG. 3, can be expanded for performing additional functions as shown in FIG. 4. The computer 21 is located in the lead vehicle 16. An odometer transducer 30 generates a signal indicating increments of distance and can be, for example, the pulse generator 19 and the pulse circuit 20 shown FIG. 2. The computer 21 is connected to an antenna 27A through a radio modem 31A and a radio transmitter 32A. Radio signals received from the second vehicle by an antenna 28A pass through the radio receiver 29 and the pulse decoder circuit 25B to the computer 21 through the pulse circuit 20 (not shown).

The second vehicle 18 also includes an odometer transducer, which can be the pulse generator 19, which is connected to an antenna 27B through the pulse encoder circuit 25A and the radio transmitter 26. Thus, the odometer transducer 19 in the second vehicle 18 generates a signal representing increments of distance traveled which signal is passed through the pulse encoder 25A and transmitted by the radio 26 in the second vehicle 18 to the computer 21 in the first vehicle 16. The computer 21 also generates a signal representing the increments of distance traveled by the first vehicle 16 through the radio modem 31A, the radio 32A and the antenna 27A to a serial display 33 in the second vehicle 18. The display 33 is connected to an antenna 18B through a radio modem 31B and a radio receiver 32B in the vehicle 27A. The serial display 33 thus can present a visual indication of the distance traveled by the first vehicle or the distance between the vehicles to enable the driver of the second vehicle 18 to maintain a predetermined distance between the vehicles.

Figure 5:
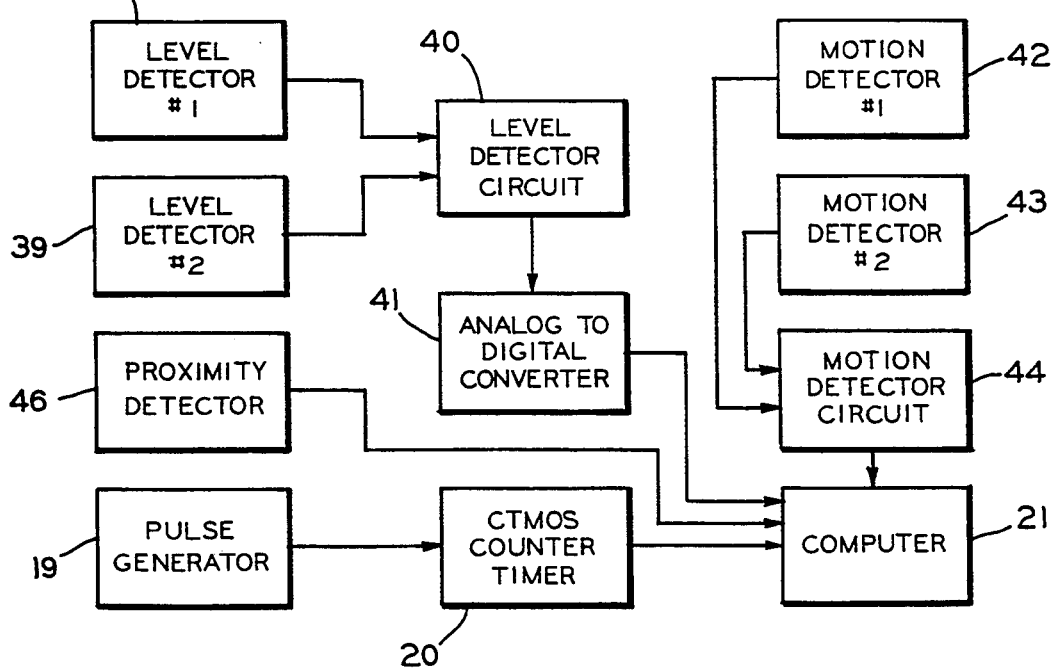
FIG. 5 is a block diagram of various sensing devices utilized with the highway survey apparatus shown in FIG. 3.

As shown in FIG. 5, the computer 21 also can receive inputs from various detectors. A first level detector 38 and a second level detector 39 are connected to inputs of a level detector circuit 40. An output of the level detector circuit 40 is connected to an input of an analog to digital converter 41. An output of the converter 41 is connected to an input of the computer 21. The detectors 38 and 39, the circuit 40 and the converter 41 sense the side to side and front to back angular change of the moving vehicle. For example, the level detector 38 can be mounted to measure angular movement along the longitudinal axis of the vehicle relative to a horizontal plane such as the road surface. The level detector 39 can be mounted along the transverse axis of the vehicle to measure relative angular movement with respect to the road plane also. The level detectors 38 and 39 can be a Model 0238309 Ratiomatic Clinometer manufactured by Schaevitz Sensing Systems, Inc. The analog to digital converter 41 can be a Model DAS-4 manufactured by Metra Byte Corp. The level detector circuit 40 is utilized to scale the output signals from the level detectors 38 and 39, typically in the range of zero to positive ten volts, to a voltage range, typically negative five volts to a positive five volts, suitable for input to the converter 41.

The traffic survey apparatus according to the present invention also permits speed zone field surveys. As shown in FIG. 5, a first motion detector 42 and a second motion detector 43 generate signals to inputs of a motion detector circuit 44. An output of the motion detector circuit 44 is connected to an input of the computer 21. The motion detectors 42 and 43 can be Model G4 Piezoelectric sensors manufactured by K Hill Signal Company, Inc. Each of the detectors 42 and 43 is connected to a separate length of flexible hose. As shown in FIG. 1, a pair of hoses 45 are stretched across the highway 11 and are connected to associated ones of the detectors 42 and 43. The hoses 45 are spaced a predetermined distance apart which distance is inputted into the computer 21. The sensors 42 and 43 each generate a signal each time a pair of vehicle wheels compresses the associated one of the hoses 45. The motion detector circuit 44 converts the output pulses from the motion detectors 42 and 43 to a signal which can be inputted to the computer 21 for information on the volume and speed of the traffic.

Also shown in the FIG. 5 is a proximity detector 46 having an output connected to an input of the computer 21. The proximity detector 46 can be mounted on the vehicle in a position to sense raised pavement markers currently installed on some highways. Thus, the markers can be detected for the purpose of comparing against inventory and determining whether markers are missing which should be replaced.

Figure 6:
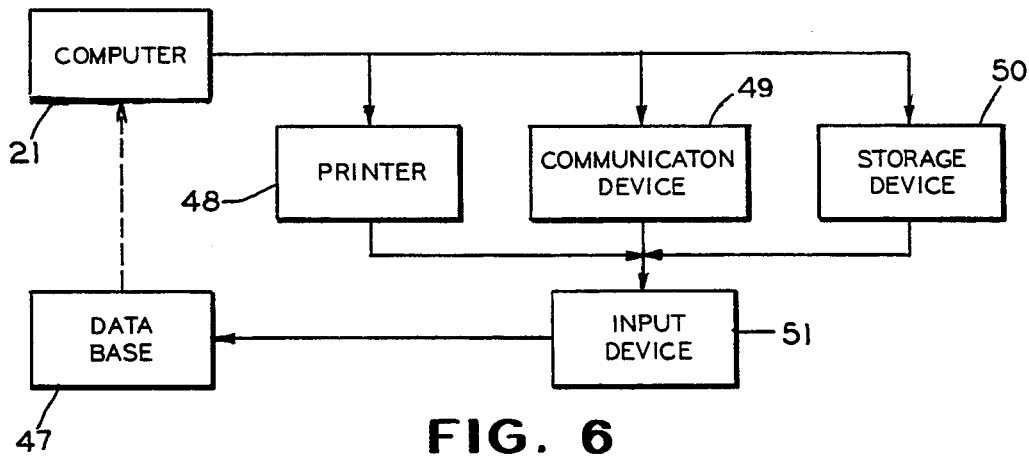
FIG. 6 is a block diagram of the data storage portion of the present invention.

The data concerning the physical features of the highway 11, which data has been inputted into the computer 21, must be organized into a data base. The data base can be formed by software and the storage means in the computer 21. However, in cases where the storage requirements for the data are quite large and for ease of access by highway engineers, the data is typically stored in a separate data base 47 as shown in FIG. 6. The data base 47 can be a large mass storage device such as a tape drive, a hard disk, or other known types of mass storage devices. The data collected by the computer 21 can be sent to any one or more of various types of output devices. For example, an output of the computer 21 is shown in FIG. 6 as being connected to a printer 48, a communication device 49, and a storage device 50. The printer 48 can produce a hard copy record of the data generated by the computer 21. The communication device 49 could be a telephone modem for transmitting the data to another computer or the data base 47. The storage device 50 could be a floppy disk, a hard disk, a taped cassette, or any other equivalent storage media.

Each of the printer 48, the communication device 49 and the storage device 50 are shown connected to a suitable input device 51 for transferring the data to the data base 47. For example, the input device 51 could be an optical code reader for sensing the hard copy the printed data from the printer 48 and inputting the data into the data base 47. The input device 51 could be a telephone modem for receiving signals through the communication device 49 and telephone lines for inputting the data into the data base 47. The input device 51 could be a disk drive or a tape drive for inputting the data stored on the storage device 50 input into the data base 47. The data base 47 can be any suitable type of commercially available computer connected to one or more mass storage devices and operating compatible data base management software. For example the software could be written in compiled Dbase III Plus with the field software portion of the applications utilizing assembler call routines out of Dbase to interface the computer 21 to all of the various detectors.

Figure 7:
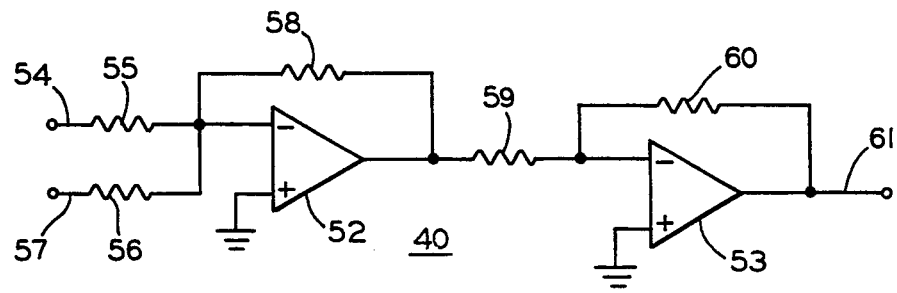
FIG. 7 is a schematic diagram of the level detector circuit of the apparatus shown in FIG. 5.

In FIG. 7, there is shown a portion of the level detector circuit 40. A pair of operational amplifiers and 53 are connected in series between an output of one of the level detectors 38 and 39 and the input to the analog to digital converter 41. For example, an input terminal 54 can be connected to the output of the level detector 38 (not shown) and connected through a resistor 55 to an inverting input of the operational amplifier 52. The inverting of the input of the operational amplifier 52 is also connected through a resistor 56 to a source of negative potential reference voltage at an input line 57. The inverting input of the operational amplifier 52 is also connected through a feedback resistor 56 to an output of the amplifier. A non-inverting input of the amplifier 52 is connected to the circuit ground potential. The output of the amplifier 52 is connected through a resistor 59 to an inverting input of the amplifier 53. A non-inverting input of the amplifier 53 is connected to the circuit ground potential and the inverting input is connected through a feedback resistor 60 to the output of the amplifier 53. The output of the amplifier 53 is connected to an output line 61 which is connected to the input of the analog to digital convertor 41. A similar circuit (not shown) is provided for the level detector 39.

The level detector circuit 40 can be formed with a quad low noise JFET input operational amplifier manufactured as an ECG 859 integrated circuit. As stated above, the circuit 40 converts the level detector output signal into a form that allows it to be inputted into the analog to digital convertor.

Figure 8:
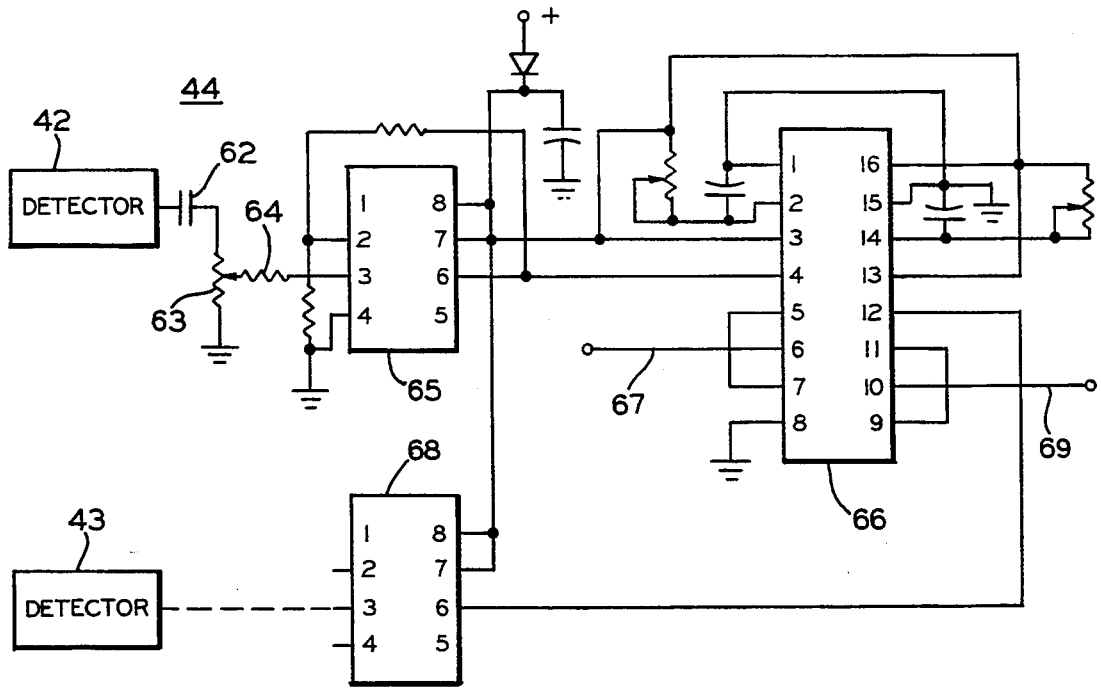
FIG. 8 is a schematic diagram of the motion detector circuit of the apparatus shown in FIG. 5.

The motion detector circuit 44 of FIG. 5 converts the output signals from the motion detectors 42 and 43 into electrical pulses that are compatible with the computer input. As shown in FIG. 8, an output from the detector 42 is connected through a capacitor 62 and the resistance of a potentiometer 63 to the circuit ground potential. The moveable contact of the potentiometer 63 is connected through a resistor 64 to a timer circuit 65. The timer circuit can be a model 7611 integrated circuit. The timer circuit 65 generates a pulse of predetermined magnitude and duration from an output terminal 65-6 to an input terminal 66-4 of one half of a dual retriggerable monostable multivibrator 66. The multivibrator 66 can be a 4534 integrated circuit. An output signal representing the pulses counted from the detector 42 is generated from an output terminal 66-6 to an output line 67. The detector 43 is connected in a similar manner to a timer circuit 68 which is connected to an input terminal 69-12 to generate a second output signal at an output a 66-10 on an output line 69.

Figure 9:
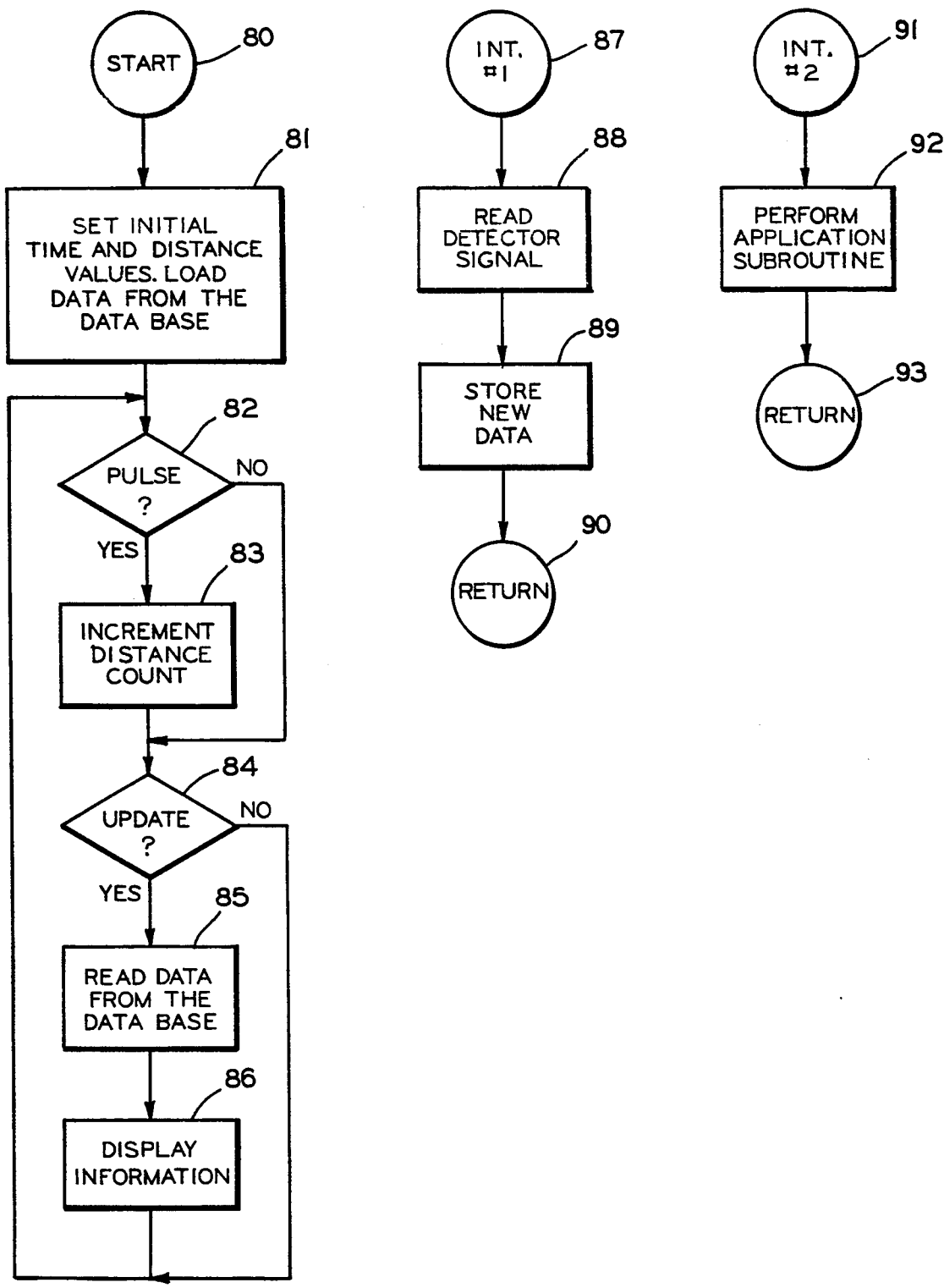
FIG. 9 is a flow diagram of the program for operating the present invention.

There is shown in FIG. 9 a flow diagram of the basic operations of the computer 27 as it collects data for the data base. The computer program begins at a START circle 80 and enters an instruction set 81 wherein initial time and distance values are set and, if required, data from the data base is loaded into memory. The program then enters a decision point 82 to check for the presence of a pulse from the pulse generator 19. If a pulse is generated, the program branches at "YES" to an instruction set 83 wherein the stored distance count is incremented. The "NO" branch from the decision point 82 and the instruction set 83 enter a decision point 84. In the decision point 84, a check is made to see whether the driver monitor 34 and operator monitor 35 displays of FIG. 4 are required to be updated. If updated information is required, the program branches at "YES" to an instruction set 85 wherein data is read from the data base. The program then enters an instruction set 86 and generates and updates the displays. The program returns from the instruction set 86 to the decision point 82. If an update is not required, the program branches from the decision point 84 at "NO" back to the decision point 82. Thus, the basic program will loop looking for distance pulses and updating the information on the displays.

Various signals can interrupt the basic loop between the decision point 82 and the instruction set 86. For example, a first interrupt at a circle 87 can be a pulse generated by the level detectors 38 and 39, one of the motion detectors 42 and 43, the proximity detector 46, or any other similar detector. The program leaves the main loop and enters the first interruption subroutine at an instruction set 88 to read the detector signal. The subroutine then enters an instruction set 89 to store the new data. The first interrupt subroutine then returns to the main loop at a return circle 90.

In a similar manner, a second interruption can be generated from one of the keyboards 36 and 37 of FIG. 4. The program leaves the main loop and enters a second interrupt subroutine at a circle 91. The second subroutine enters an instruction set 92 to perform a select application subroutine. After the subroutine has been performed, the second interrupt subroutine returns to the main loop at a return circle 93. The instruction set 92 is representative of a plurality of different application modules each having associated detectors for generating highway data and software for identifying the detector signals to be read by the computer referencing of the detector signals to the location of the vehicle.

One of the application modules of the apparatus according to the present invention is a pavemarking application which consists of a CenterLine Survey Option, Pavement Marking Inventory software and Pavement Marking Maintenance software. This application requires the equipment shown in FIG. 4 and three individuals, a driver and operator for the first or lead vehicle and a driver for the second or trailing vehicle. The serial display 33 is utilized by the driver of the second vehicle to maintain a predetermined distance between the vehicles which distance is entered into the computer 21. The operator in the first vehicle faces toward the second vehicle and inputs data as to when various physical features of the highway block his view of a predetermined point on the second vehicle. The driver of the second vehicle operates a switch (not shown) to generate a signal through the radio 32 when physical features of the road block his view of a predetermined point on the first vehicle. Thus, the information or highway data entered into the computer 21 is useful for establishing no passing zones and locations for various traffic signals warning of hidden hazards.

The Pavement Marking Inventory software allows existing pavement marking to be inventoried in the field. All existing pavement markings can be inventoried including no passing zones, lane lines, edge lines, and auxiliary markings. The Pavement Marking Maintenance software allows computerized maintenance of all pavement markings. For example, during the application of the center line stripes 12 to the highway 11, data can be entered as to when and where the stripes were applied and how much material was used.

Another application module is speed zone maintenance. This application includes a Speed Zone Field Survey Option and Zone Maintenance software. The Speed Zone Field Survey Option installs in one vehicle and requires at least one trained operator. This application gives you the ability to perform all actions necessary to determine warranted speeds. All field data is collected automatically utilizing the computer 21, the two keyboards 36 and 37 and the automated sensing devices: the pulse generator 19, the level detectors 38 and 39, and the motion detectors 42 and 43 as shown in FIG. 5. The Zone Maintenance software allows computerized maintenance of all speed zone functions including accident reporting by zone, tracked volume counting by zone, and the ability to project from all pertinent data.

A curve analysis/inventory application module includes a Curve Analysis/Inventory Field Option and Curve Analysis/Inventory Maintenance software. This application installs on one vehicle and requires two trained operators. System input is through the two keyboards 36 and 37 and three automated sensing devices: the pulse generator 19, and the level detectors 38 and 39. The Curve Analysis/Inventory Maintenance software allows computerized maintenance of all curve information including the ability to query the data base by road or rate of speed.

A raised pavement marker maintenance application module includes a Raised Pavement Marker Data Acquisition System and Raised Pavement Marker Maintenance software. The Data Acquisition System option allows high speed automated data acquisition of presently installed raised pavement markers utilizing the proximity detector 46. The location of raised pavement markers also can be manually entered into the computer 21 via the operator keyboard 37. The maintenance software allows computerized maintenance of all marker information including the ability to query the data base by road, section of road, or marker concentration. The stored data permits the generation of summary sheets for new installation and allows the establishment a comprehensive reflector replacement program.

A sign maintenance application module includes a Field Inventory Option and Sign Maintenance software. The Field Inventory Option consists of the basic distance measuring system with which you can inventory all types of signs including interstate, expressway, primary road, secondary road and facility signs. The Sign Maintenance software allows the data base to generate information to aid traffic engineers by extracting information by county, road, sign type, and sign age.

A signal maintenance application module includes a Field Inventory Option and Signal Maintenance software. The Field Inventory Option allows all types of signals to be inventoried in the field using the basic package. These signals include traffic signals, overhead flashers, flashing devices and school flashers. The Signal Maintenance software provides the ability to monitor and maintain service calls, electric billing, maintenance and replacement.

A lighting maintenance application module allows complete control of all roadway and facility lighting functions. This includes service calls, electric billing and inventory control. Field inventorying can be accomplished using the basic system and Field Lighting Maintenance software.

A delineator maintenance application module allows field and office functions to be performed on roadside delineators. This includes initial field inventorying using the basic system to enter data into the data base. Summary sheets for new jobs can be generated along with an accurate inventory of delineators both installed in the field and stored in warehouse.

A specialized traffic accounts application allows special events to be recorded in the field. The application is primarily intended to allow the system to keep track of left turn lane counts. All information is inputted through the driver keyboard 36.

The present invention concerns an apparatus for surveying highways including a computer adapted to be installed in a vehicle, transducer means connected to said computer for sensing increments of distance travelled along a highway by the vehicle and generating a distance signal to said computer, at least one detector means connected to said computer for sensing a parameter of the highway and generating a detector signal to said computer, and means in said computer for generating a highway data signal referencing said detector signal to said distance signal and for storing said highway data signal. The computer stores said highway data signal and is connected to an output device for outputting said highway data collected by said computer. A data base for storing highway data is provided and an input device is connected to said data base for inputting said highway data from said output device. A plurality of application modules utilize selected detectors and application subroutines to perform applications associated with pavemarking, speed zone maintenance, curve analysis/inventory, raised pavement marker maintenance, sign maintenance, signal maintenance, lighting maintenance, delineator maintenance and specialized traffic accounts.

Figure 10:
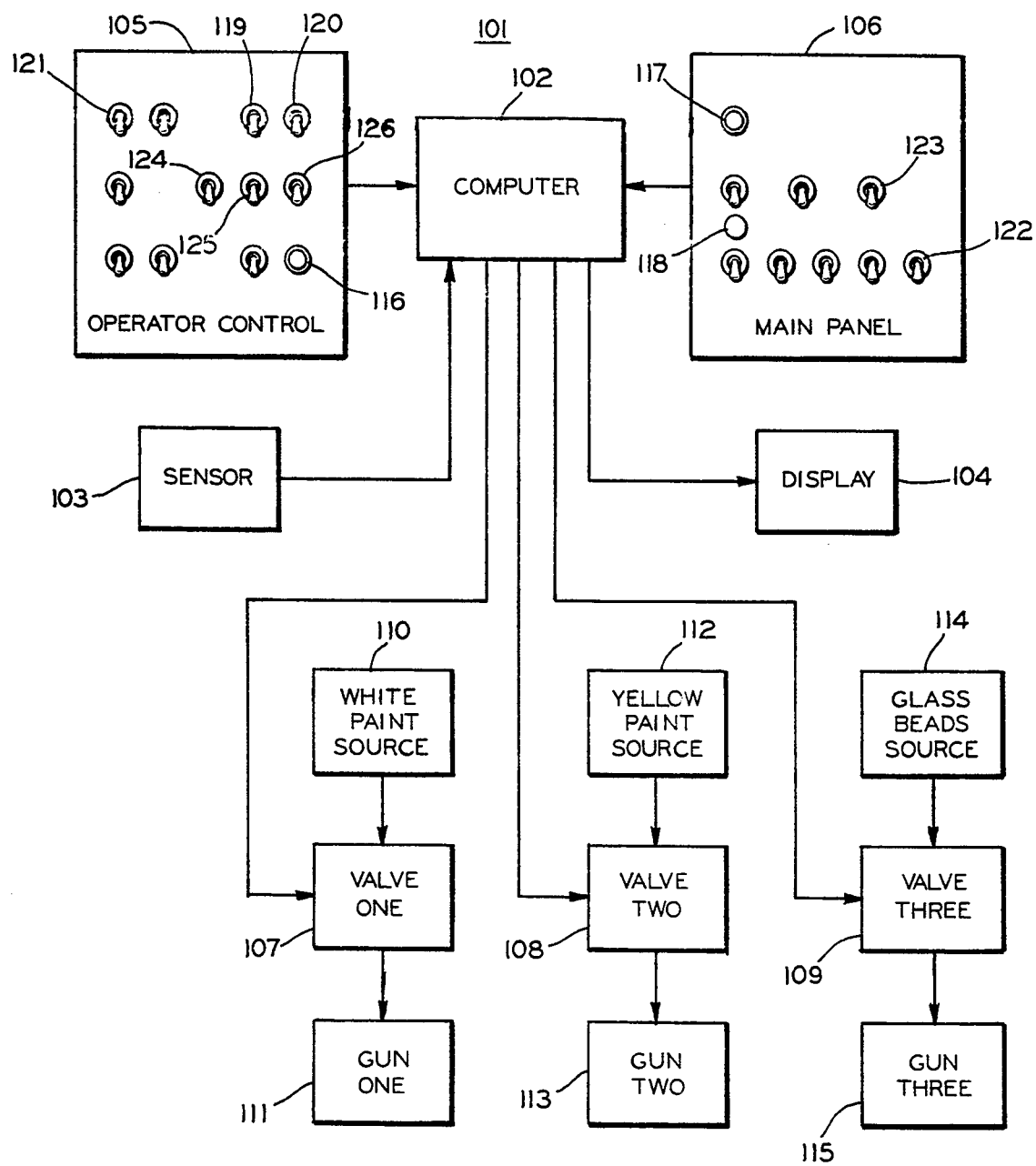
FIG. 10 is a block diagram of a highway striping system in accordance with the present invention.

There is shown in the FIG. 10 a highway striping system 101, for use with the Pavement Marking Maintenance software previously mentioned, in accordance with the present invention. The system 101 includes a computer 102 which could be any suitable microcomputer such as the computer 21 shown in the FIG. 2. A sensor 103 is connected to an input of the computer 102 to generate a signal representing increments of distance traveled by an associated vehicle (not shown). The sensor 103 can be the pulse generator 19 and the pulse circuit 20 shown in the FIG. 2. An output of the computer 102 is connected to a display 104.

The computer 102 is also connected to an operator control 105 for receiving various input signals. Additional input signals can be generated from a main panel 106 which is also connected to an input of the computer 102. The computer 102 has outputs connected to three valves; a Valve One 107, a Valve Two 108, and a Valve Three 109.

The Valve One 107 is connected between a White Paint Source 110 and a Gun One 111. The Valve Two 108 is connected between a Yellow Paint Source 112 and a Gun Two 113. The Valve Three 109 is connected between a Glass Beads Source 114 and a Gun Three 115.

The paint striping system 101 is typically mounted on a vehicle (not shown) such as a truck. The vehicle is driven down the road and the paint striper system 101 applies paint in the form of dashed white and yellow lines and solid white and yellow lines, and glass beads on the paint to the surface of the road. The computer 102 permits the operator to select the length of the dashed lines and also the skip length, the distance between the dashed lines, as required. The computer 102 is also utilized to keep track of how long a gun is on in order to calculate what quantity of paint should have been used for the lines which have been painted. The glass beads are blown into the paint after it is applied to give the line reflectivity at night so the computer 102 must coordinate the application of the glass beads with the application of the paint. The computer 102 not only keeps track of the amounts of white and yellow paint which should have been used, but also has provision for two independently resettable counters for each color. These counters allow the operator to use one counter total as a route total and reset it at the end of each route, and to use the other counter total as a day total. This simplifies the completion of the necessary paper work at the end of the day. It also allows the operator to compare material usage, i.e. what should have been used versus what was used when all material in the paint and glass bead tanks has been used.

The operator control 105 has a power on/off indicator lamp 116 and a plurality of toggle switches which can be set by the operator for generating input signals to the computer 102. Similarly, the main panel 106 includes a power on/off indicator lamp 117 and a plurality of toggle switches for generating input signals to the computer 102. The panel 106 is also protected by a fuse 118.

Provided on the operator control 105 are an Out switch 119 and an In switch 120. The Out switch 119 and the In switch 120 are each three position toggle switches for selecting a solid line, a dashed line or no line. The Out switch 119 controls the application of an edge line and the In switch 120 controls the application of a center line. As shown in the FIG. 10, each of the sources is associated with an individual valve and gun. Thus, the elements 107 through 115 would be provided for applying either the edge line or the center line and a duplicate set of such elements would be provided for applying the other one of the lines. Such a configuration permits the application of white or yellow paint, and glass beads with either color of paint, to be selected for both the center line and the edge line.

However, other configurations of these elements would provide similar operation. For example, the Gun One 111 could be utilized to apply the center line and the Gun Two 113 could be utilized to apply the edge line. The Valve One 107 and the Valve Two 108 could be connected to both the Gun One 111 and the Gun Two 113 to permit white or yellow paint to be applied to each of the highway lines. The Gun Three 115 could be eliminated and the Valve Three 109 could be connected to both the Gun One 111 and the Gun Two 113 to permit the glass beads to be applied to both of the highway lines.

The operator control 105 also includes a hold/reset switch 121. The switch 121 can be utilized to inhibit the dash painting cycle thereby preventing a dash from being painted if the system 101 is in a dash portion of its cycle and one of the guns is being utilized to paint dashes. As soon as the hold/reset switch is released, the dash cycle is reset to paint dashes and a new dash will be started by the gun being controlled to paint dashes. Such operation makes it easier to match existing lines when tracing. The main panel 106 includes a color switch 122 for selecting between the white paint source 110 and the yellow paint source 112. The main panel 106 also includes a total display switch 123 which can be actuated to signal the computer 102 to output accumulated information such as the estimated quantity measurements represented by the counter totals. The output is generated to the display 104 where it is visually presented.

The operator control 105 also includes switches 124, 125 and 126 for changing the length of the skip and the length of the dash. The switch 124 can be utilized to select whether the skip will be incremented or decremented. The switch 125 can be utilized to select whether the dash will be incremented or decremented and the switch 126 can be utilized to select two or more predetermined standard increment lengths which can be added to or subtracted from to increment and decrement the lengths of the skips and the dashes.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for surveying and marking highways comprising:
   a computer for installation in a first vehicle;
   first transducer means connected to said computer for sensing increments of distance travelled by the first vehicle and generating a first distance signal representing the increments of distance to said computer, said computer being responsive to said first distance signal and a second distance signal representing increments of distance travelled by a second vehicle for generating a difference signal representing the spacing between the first vehicle and the second vehicle;

a first radio modem connected to said computer;
a first antenna;
a first radio transmitter connected between said modem and said first antenna for generating said difference signal as a first radio signal;
a pulse decoder connected to said computer;
a second antenna;
a first radio receiver connected between said pulse decoder and said second antenna for receiving a second radio signal and generating said second distance signal to said computer;
a display means for installation in a second vehicle;
a second radio modem connected to said display means;
a third antenna;
a second radio receiver connected between said second radio modem and said third antenna for receiving said first radio signal and generating said difference signal to said display means;
a second transducer means for sensing increments of distance travelled by the second vehicle and generating said second distance signal;
a pulse encoder connected to said second transducer means;
a fourth antenna; and
a second radio transmitted for installation in the second vehicle and connected between said pulse encoder and said fourth antenna and responsive to said second difference signal for generating said second radio signal whereby said display means indicates the spacing between the first and second vehicles in response to said difference signal.

2. The apparatus according to claim 1 including a pair of level detectors mounted on the vehicle for generating detector signals representing side to side and front to back angular change of the vehicle with respect to the highway, a level detector circuit connected between said level detectors and said computer for scaling a magnitude of said detector signals and an analog to digital converter connected between said level detector circuit and said computer for converting said detector signals from analog to digital form.

3. The apparatus according to claim 1 including a proximity detector circuit connected to said computer for sensing raised pavement markers and for generating a detector signal representing each marker to said computer.

4. The apparatus according to claim 1 including a pair of motion detectors for generating detector signals representing the passage of a vehicle on the highway and a motion detector circuit connected between said motion detectors and said computer for converting said detector signals to computer input signals.

5. The apparatus according to claim 1 wherein said computer stores said first distance signal as highway data and including an output device connected to said computer for outputting said highway data collected by said computer, a data base for storing highway data and an input device connected to said data base for inputting said highway data from said output device.

6. An apparatus for surveying and marking highways comprising:
a computer for installation in a vehicle;
a storage device connected to said computer;
a first transducer means connected to said computer for sensing increments of distance travelled along a highway by a first vehicle and generating a first distance signal representing the increments of distance to said computer, said computer being responsive to said first distance signal and a second distance signal for generating a difference signal representing the spacing between the first vehicle and a second vehicle;
a pavemaking application module including a first radio modem connected to said computer, a first radio transmitter connected between said modem and a first antenna for generating said distance signal as a first radio signal, a pulse decoder connected to said computer, a first radio receiver connected between said pulse decoder and a second antenna for receiving a second radio signal and generating said second distance signal to said computer, a display means for installation in the second vehicle, a second radio modem connected to said display means, a second radio receiver connected between said second radio modem and a third antenna for receiving said first radio signal and generating said distance signal to said display means, a second transducer means for sensing increments of distance travelled by the second vehicle and generating said second distance signal, a pulse encoder connected to said second transducer means, and a second radio transmitter connected between said pulse encoder and a fourth antenna and responsive to said second distance signal for generating said second radio signal whereby said display means indicates the spacing between the first and second vehicles; and
a least one application module means connected to said computer for sensing a parameter of the highway other than increments of distance and generating a detector signal representing the parameter sensed to said computer, said computer being response to said first distance signal and said detector signal for generating a highway data signal referencing said detector signal to said first distance signal and storing said highway data signal in said storage device.

7. The apparatus according to claim 6 wherein said one application module is a speed zone maintenance application module including a pair of level detectors mounted on the vehicle for generating detector signals representing side to side and front to back angular change of the vehicle with respect to the highway and a pair of motion detectors for generating detector signals representing the passage of a vehicle on the highway.

8. The apparatus according to claim 6 wherein said one application module is a curve analysis/inventory application module including a pair of level detectors mounted on the vehicle for generating detector signals representing side to side and front to back angular change of the vehicle with respect to the highway.

9. The apparatus according to claim 6 wherein said one application module is a raised pavement marker maintenance application module including a proximity detector circuit connected to said computer for sensing raised pavement markers and for generating a detector signal representing each said pavement marker to said computer.

10. The apparatus according to claim 6 wherein said one application module is one of a sign maintenance application module, a signal maintenance application module, a lighting maintenance application module, a delineator maintenance application module and a specialized traffic accounts application module.

11. The apparatus according to claim 6 including at least one source of material to be applied to the highway, at least one gun for applying the material to the highway and at least one valve connected between said source and said gun and connected to said computer and wherein said one application module includes a main panel and an operator control panel connected to said computer for generating input signals whereby said computer is responsive to said input signals for controlling said valve to selectively apply the material to the highway.

12. An apparatus for surveying and marking highways comprising:
- a computer for installation in a vehicle;
- a storage device connected to said computer;
- transducer means connected to said computer for sensing increments of distance travelled along a highway by the vehicle and generating a distance signal representing the increments of distance to said computer; and
- at least one application module means connected to said computer for sensing a parameter of the highway other than increments of distance and generating a detector signal representing the parameter sensed to said computer, said computer being responsive to said distance signal and said detector signal for generating a highway data signal referencing said detector signal to said distance signal and storing said highway data signal in said storage device, said one application module including a flow detector connected to a traffic line application gun for measuring a flow of material through said gun.

* * * * *